US010297962B1

(12) United States Patent
Costello et al.

(10) Patent No.: US 10,297,962 B1
(45) Date of Patent: May 21, 2019

(54) ELECTRICAL CONNECTOR FOR A POWER BUSBAR

(71) Applicant: TE CONNECTIVITY CORPORATION, Berwyn, PA (US)

(72) Inventors: Brian Patrick Costello, Scotts Valley, CA (US); David Patrick Orris, Middletown, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 15/865,300

(22) Filed: Jan. 9, 2018

(51) Int. Cl.
*H01R 25/14* (2006.01)
*H01R 25/16* (2006.01)
*H01R 35/04* (2006.01)
*H02B 1/20* (2006.01)
*H01R 13/17* (2006.01)

(52) U.S. Cl.
CPC ........... *H01R 25/145* (2013.01); *H01R 13/17* (2013.01); *H01R 25/162* (2013.01); *H01R 35/04* (2013.01); *H02B 1/205* (2013.01)

(58) Field of Classification Search
CPC .... H01R 25/145; H01R 13/17; H01R 25/162; H01R 35/04
USPC .......................................................... 439/251
See application file for complete search history.

(56) References Cited

U.S. PATENT DOCUMENTS 5,421,751 A * 6/1995 Bennett ................ H01R 13/187 439/786
5,431,576 A * 7/1995 Matthews ............ H01R 13/113 439/247
6,497,580 B2 * 12/2002 Watanabe ............ H05K 7/1439 439/31
7,014,516 B2 * 3/2006 Yang .................... H01R 13/187 439/170
7,581,972 B2 * 9/2009 Daamen ............. H01R 13/6315 439/249
7,604,498 B2 * 10/2009 Mahajan .............. H01R 4/2404 174/71 R
7,997,910 B2 * 8/2011 Myers .................. H01R 25/142 439/121
8,388,389 B2 * 3/2013 Costello ................ H01R 13/18 439/637
8,881,481 B2 * 11/2014 Myers ..................... E04B 9/006 52/506.08

(Continued)

FOREIGN PATENT DOCUMENTS

KR 100937392 B1 1/2010

*Primary Examiner* — Alexander Gilman

(57) ABSTRACT

An electrical connector includes a base disposed along a central axis having a base terminal end and a base contact end. A lever arm is disposed along the central axis and has a biasing end and a lever arm contact end. At least two conductors are interposed between the base and the lever arm, and include contact ends opposite each other separated by an opening configured to receive a power busbar. The conductors have terminal ends opposite each other and separated by a slot configured to receive an electrical component. A hinge pivotally attaches between the base and the lever arm at a pivot axis for rotation of the lever arm about the pivot axis between an engaged position for electrical coupling of the at least two conductors with the power busbar and a disengaged position for electrical decoupling of the at least two conductors from the power busbar.

20 Claims, 3 Drawing Sheets

10
188
20
252
222
34
100
3°-5°
186
30
189
166
126
118
260
250
168
194
202

(56) References Cited

U.S. PATENT DOCUMENTS 9,257,804 B1 * 2/2016 Beck .................... H01R 25/142
9,800,004 B1 * 10/2017 Schepis ................ H01R 25/162

* cited by examiner

ELECTRICAL CONNECTOR FOR A POWER BUSBAR

BACKGROUND OF THE INVENTION

The subject matter herein relates generally to an electrical connector for a power distribution system, and more particularly to an electrical connector for electrical coupling between an electrical component and a power busbar.

Electrical power distribution systems commonly use busbar connection assemblies to distribute electrical power from a power source to a number of electrical devices or components. For instance, some power distribution systems include racks of vertically arranged electrical devices. Each rack may include power busbars that are configured to receive electrical power from the power source and distribute the electrical power to each of the electrical devices.

Typically, a power busbar is realized as a vertical strip conductor that extends along the vertical length of the rack. The electrical devices connect to the power busbar using connectors that electrically couple with the power busbar with a low resistance interface to reduce power losses in the power distribution system. In order to achieve the low resistance interface, the electrical interface must maintain a large contact force. Accordingly, busbar connection systems commonly use methods that fasten or bolt onto the power busbar in order to achieve the high contact force needed for the lower resistance interface. However, bolting to the power busbar is cumbersome and time-consuming to install. In addition, bolted connections to the power busbar are limited to predetermined locations along the busbar that include features to mate with the fasteners, such as mounting holes.

Accordingly, there is a need for an electrical connector that provides for easy, flexible, and reliable low resistance connection of electrical devices with a power busbar.

BRIEF DESCRIPTION OF THE INVENTION

In one embodiment, an electrical connector is provided that includes a base disposed along a central axis and has a base terminal end and a base contact end. A lever arm is disposed along the central axis and has a biasing end and a lever arm contact end. At least two conductors are interposed between the base and the lever arm. Each conductor has a conductor contact end. The conductor contact ends are opposite each other and separated by an opening configured to receive a power busbar. Each conductor has a conductor terminal end. The conductor terminal ends are opposite each other and separated by a slot configured to receive an electrical component. A hinge pivotally attaches between the base and the lever arm at a pivot axis for rotation of the lever arm about the pivot axis between an engaged position for electrical coupling of the at least two conductors with the power busbar and a disengaged position for electrical decoupling of the at least two conductors from the power busbar.

In another embodiment, an electrical connector for electrical communication between a power busbar and an electrical component is provided that includes a base having a terminal end and a base contact end. A lever arm has a biasing end and a lever arm contact end. A conductor is interposed between the base and the lever arm, the conductor having a conductor contact end proximate the lever arm contact end, and a conductor terminal end configured for electrical coupling with the electrical component. A hinge is pivotally attached between the base and the lever arm at a pivot axis for rotation of the lever arm about the pivot axis between an engaged position for electrical coupling of the conductor with the power busbar and a disengaged position for electrical decoupling of the conductor from the power busbar. A biasing member is operatively connected between the base and the lever arm, the biasing member being configured for biasing the lever arm in an engagement direction towards the engaged position.

In yet another embodiment, an electrical connector is provided that includes a base disposed along a central axis and having a terminal end and a base contact end. A lever arm is disposed along the central axis and having a biasing end and a lever contact end, the lever arm being pivotally connected to the base at a pivot axis. At least two conductors are interposed between the base and the lever arm. Each conductor has a conductor contact end. The conductor contact ends are opposite each other and separated by an opening configured to receive a power busbar. Each conductor has a conductor terminal end. The conductor terminal ends are opposite each other and separated by a slot configured to receive an electrical component. A hinge member is pivotally attached between the base and the lever arm at the pivot axis for movement of the lever arm about the pivot axis between an engaged position for electrical coupling of the at least two conductors with the power busbar and a disengaged position for electrical decoupling of the at least two conductors from the power busbar. One or more contacts extend from each conductor contact end along a central axis, having one or more arcuate portions configured to provide electrical contact with the power busbar at one or more contact points in the engaged position.

DETAILED DESCRIPTION OF THE INVENTION

Figure 1:
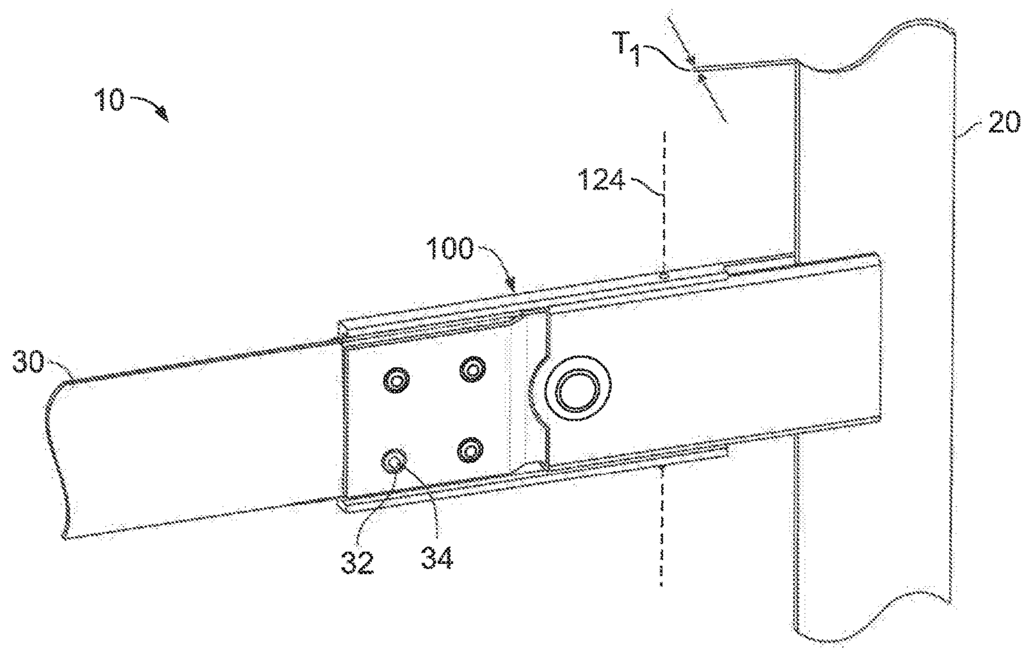
FIG. 1 is a front perspective view of an electrical connector for a power distribution system formed in accordance with an embodiment.
Figure 2:
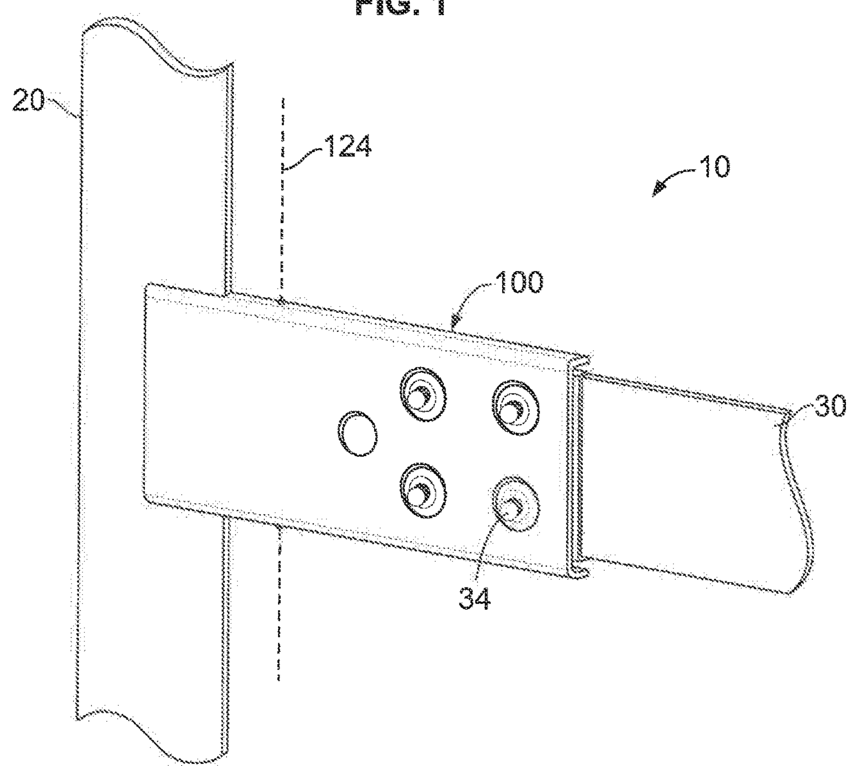
FIG. 2 is a rear perspective view of the electrical connector for the power distribution system in accordance with an embodiment.

FIG. 1 is a front perspective view of an electrical connector 100 for a power distribution system 10 formed in accordance with an embodiment. FIG. 2 is a rear perspective view of the electrical connector 100 for the power distribution system 10 in accordance with an embodiment. The power distribution system 10 is adapted to communicate electrical power from a power source (not shown) to one or more electrical devices or components (not shown) via an electrical conductive path. In an exemplary embodiment, the electrical conductive path may include a power busbar 20, a component terminal 30, and the electrical connector 100 detachably coupled therebetween. Optionally, the power distribution system 10 may include any number of power busbars 20, component terminals 30, and/or electrical connectors 100. In an exemplary embodiment, the power distribution system 10 may be configured to convey up to 500 amps through the electrical conductive path, but may be configured to convey any amount of power. In the illustrated embodiment, the electrical connector 100 conveys electrical power in the power distribution system 10. However, the power distribution system 10 may be another type of electrical system in an alternative embodiment. For example, the power distribution system 10 may be any device that includes a power busbar 20 configured to communicate electrical power with one or more electrical components 30.

As shown in FIGS. 1 and 2, the power busbar 20 is a vertically orientated linear bar having a thickness $T_1$. However, the power busbar 20 may comprise any suitable configuration capable of coupling with the electrical connector 100. In the illustrated embodiment, the thickness $T_1$ is substantially uniform, but may have varying sizes in other embodiments. The power busbar 20 may be stamped, forged, otherwise formed from a conductive material, such as copper, aluminum, metal alloys, and the like. The component terminal 30 is a horizontally orientated linear bar positioned generally coplanar with the power busbar 20. Optionally, the component terminal 30 has a set of holes 32 configured for mechanically connecting to the electrical connector 100 with fasteners 34. However, the component terminal 30 may comprise any suitable configuration and thickness capable of coupling with the electrical connector 100. The component terminal 30 may be stamped, forged, otherwise formed from a conductive material, such as copper, aluminum, metal alloys, and the like.

Figure 3:
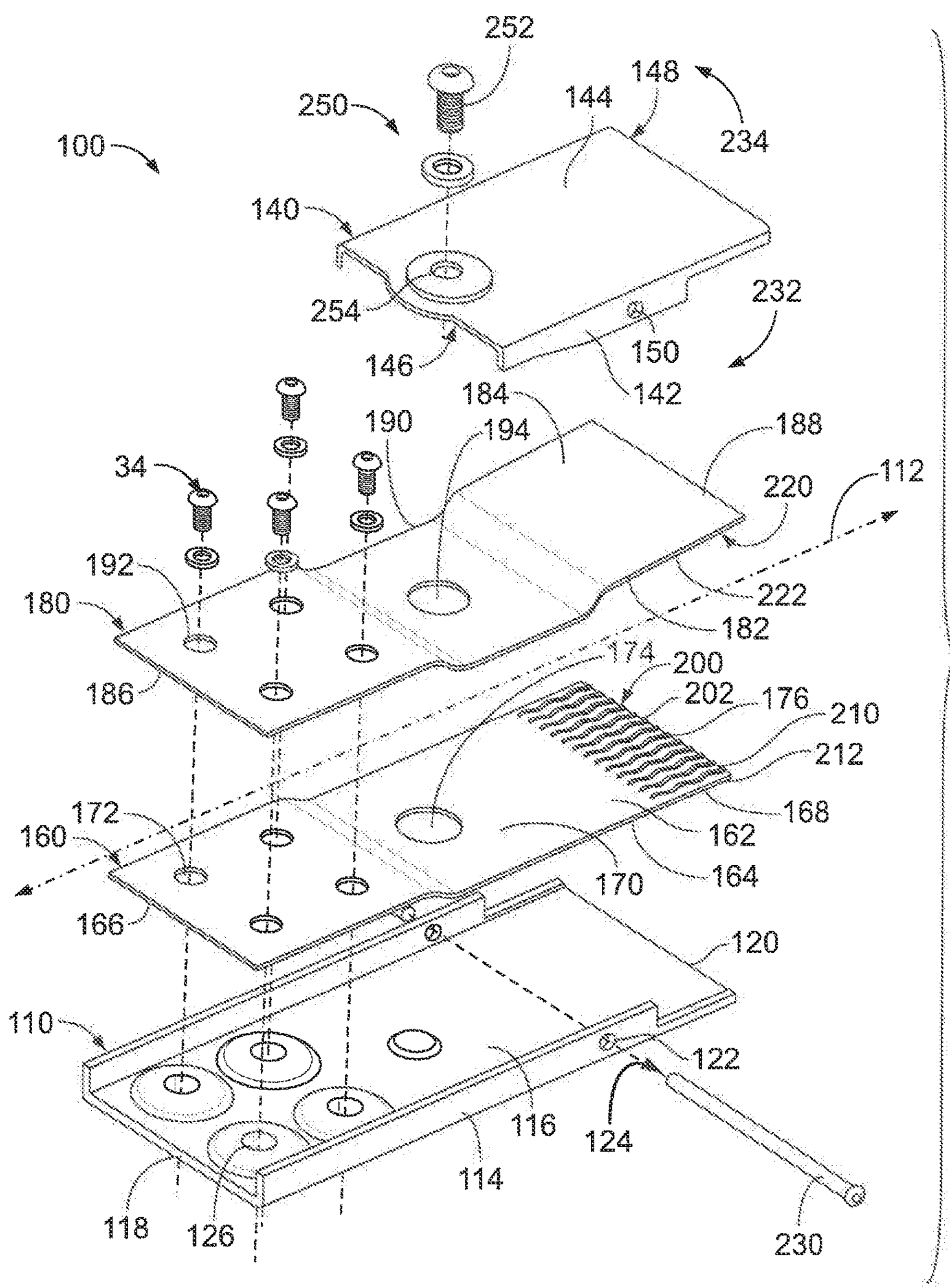
FIG. 3 is an exploded perspective view of the electrical connector in accordance with an embodiment.

FIG. 3 is an exploded perspective view of the electrical connector in accordance with an embodiment. The electrical connector 100 includes a base 110 disposed along a central axis 112 having first and second sidewalls 114 and a lower wall 116 extending therebetween. The base 110 includes a base terminal end 118 and base contact end 120. Each sidewall 114 includes a pivot hole 122 proximate the base contact end 120 and aligned along a pivot axis 124. A set of threaded holes 126 extend through the lower wall 116 proximate the base terminal end 118. The threaded holes 126 are configured to receive fasteners 34 for securing the electrical connector 100 the component terminal 30. For example, the lower wall 116 may include four threaded holes 126 spaced apart in a generally rectangular pattern that aligns with the set of four holes 32 of the component terminal 30. In alternate embodiments, the holes 32, 126 can be configured in any suitable number and pattern to connect the component terminal 30 to the base 110. The base 110 may be stamped, forged, otherwise formed from a conductive material, such as copper, aluminum, metal alloys, and the like. Optionally, the base 110 may be stamped, forged, or otherwise formed from a non-conductive material, such as plastic, composite materials, and the like.

The electrical connector 100 includes a lever arm 140 disposed along the central axis 112 having first and second sidewalls 142 and an upper wall 144 extending therebetween. The lever arm 140 includes a biasing end 146 and lever arm contact end 148. Each sidewall 142 includes a pivot hole 150 proximate the lever arm contact end 148 and aligned along the pivot axis 124. The lever arm 140 may be stamped, forged, otherwise formed from a conductive material, such as copper, aluminum, metal alloys, and the like. Optionally, the lever arm 140 may be stamped, forged, or otherwise formed from a non-conductive material, such as plastic, composite materials, and the like.

The electrical connector 100 includes conductors, such as a lower conductor 160 and an upper conductor 180, interposed between the base 110 and the lever arm 140. As set forth in greater detail below, the conductors 160, 180 are configured to electrically couple the power busbar 20 and the component terminal 30 to communicate electrical power (FIGS. 1-2). Each conductor 160, 180 may be a single continuous piece of material. For example, the conductors 160, 180 may be stamped and formed from sheet metal or may be molded or cast using a conductive material, such as copper. Although two conductors are shown in FIG. 3, alternate embodiments of the electrical connector may include more or fewer conductors.

The lower conductor 160 is disposed along the central axis 112 having an interior surface 162 and an exterior surface 164 that face opposite directions. The lower conductor 160 includes a conductor terminal end 166, a conductor contact end 168, and an intermediate portion 170 extending therebetween. In the exemplary embodiment, the intermediate portion 170 and the conductor contact end 168 are co-planar and positioned at a first level, while the conductor terminal end 166 is positioned at a second level which is generally parallel and non-planar with the first level. The lower conductor 160 includes a set of holes 172 proximate the conductor terminal end 166. The holes 172 are configured to receive the fasteners 34 and secure the lower conductor 160 to the base 110. For example, the conductor terminal end 166 may include four holes 172 spaced apart in a generally rectangular pattern that aligns with the set of threaded holes 126 of the base 110. In alternate embodiments, the holes 126, 172 can be configured in any suitable number and pattern to connect the lower conductor 160 to the base 110. The intermediate portion 170 includes an opening 174. For example, the opening may be a circular bore configured to receive the fastener 252. However, any other size and shape of opening can be used.

The lower conductor 160 includes an array of contacts 200 proximate the conductor contact end 168. The array of contacts 200 is configured to electrically couple with the power busbar 20 at a plurality of contact points 202. For example, the array of contacts 200 may include a plurality of contacts or fingers 210 extending from a terminating edge 176 of the conductor contact end 168 towards the intermediate portion 170. The fingers 210 are positioned non-planar with and adjacent to the interior surface 162 of the lower conductor 160. Each finger 210 includes a plurality of raised arcuate portions 212 that are configured to electrically contact the power busbar 20 at the contact points 202. The arcuate portions 212 are configured to mate with the conductor 160 to decrease the resistance interface. For instance, each finger 210 may embody a wave pattern as viewed from the side. Optionally, the fingers 210 may flex when contacting the power busbar 20 so that the fingers 210 are positioned at an angle relative to the interior surface 162. The curvature of the arcuate portions 212 provide for reliable contact between the fingers 210 and the power busbar 20 at any angular position of the fingers 210. As shown in FIG. 3, the array of contacts 200 include twelve fingers 210 configured to contact the power busbar 20 at thirty-six contact points 202. In alternate embodiments, the array of contacts 200 may embody any number, shape, and/or configuration that provides multiple reliable electrical contact points with the power busbar 20.

The upper conductor 180 is disposed along the central axis 112 having an interior surface 182 and an exterior surface 184 that face opposite directions. The upper conductor 180 includes a conductor terminal end 186, a conductor contact end 188, and an intermediate portion 190 extending therebetween. In the exemplary embodiment, the conductor terminal end 186 and the conductor contact end 188 are co-planar and positioned at a first level, while the conductor intermediate portion 190 is positioned at a second level which is generally parallel and non-planar with the first level. The upper conductor 180 includes a set of holes 192 proximate the conductor terminal end 186. The holes 192 are configured to receive the fasteners 34 and secure the upper conductor 180 to the base 110. For example, the conductor terminal end 186 may include four holes 192 spaced apart in a generally rectangular pattern that align with the set of threaded holes 126 of the base 110. In alternate embodiments, the holes 126, 192 can be configured in any suitable number and pattern to connect the upper conductor 180 to the base 110. The intermediate portion 190 includes an opening 194. For example, the opening may be a circular bore configured to receive a fastener 252. However, any other size and shape of opening can be used.

Figure 4:
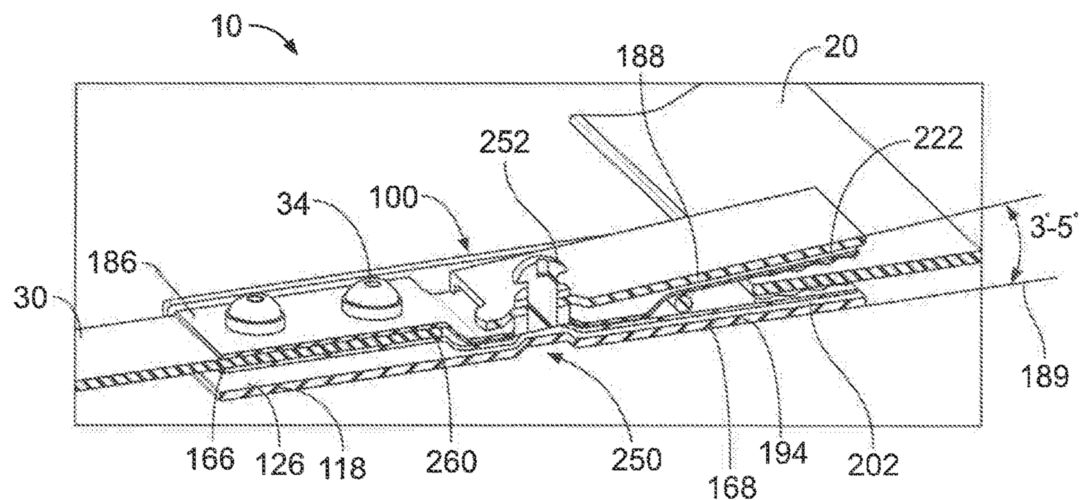
FIG. 4 is a cross-section perspective view of the electrical connector in a disengaged position in accordance with an embodiment.

The upper conductor 180 includes an array of contacts 220 proximate the conductor contact end 188 (shown in FIG. 4). The array of contacts 220 is configured to electrically couple with the power busbar 20 at a plurality of contact points 222. In the exemplary embodiment, the array of contacts 220 of the upper conductor 180 has an identical configuration to the array of contacts 200 of the lower conductor 160. However, in alternate embodiments the array of contacts 220 may embody any number, shape, and/or configuration that provides multiple reliable electrical contact points with the power busbar 20.

A hinge 230 pivotally attaches between the base 110 and the lever arm 140 at the pivot axis 124 for rotation of the lever arm 140 about the pivot axis 124 in either an engagement direction 232 towards an engagement position (FIG. 5) or a disengagement direction 234 towards a disengagement position (FIG. 4). For example, the hinge 230 may be a pivot pin that extends along the pivot axis 124 through the pivot holes 122 along the sidewalls 114 of the base 110 and the pivot holes 150 along the sidewalls 142 of the lever arm 140. The pivot pin may be secured in any suitable manner, such as a retaining ring, flange, and the like. Alternatively, the hinge 230 may be a cotter pin, clevis pin, quick release pin, shoulder screws, and/or features formed into the base and/or lever arm.

A biasing member 250 operatively connects the base 110 and the lever arm 140 and is configured to bias the lever arm 140 in an engagement direction 232 towards an engaged position to electrically couple the upper and lower conductors 160, 180 to the power busbar 20. For example, the biasing member 250 may include the fastener 252 threadedly engaged with a threaded bore 254 proximate the biasing end 146 of the lever arm 140. The fastener 252 is configured to advance through the threaded bore 254 and the openings 174, 194 and exert a force against the lower wall 116 of the base 110 to move the lever arm 140 in the engagement direction 234. In addition, the fastener 252 is configured to retract through the threaded bore 254 to allow for movement of the lever arm 140 in the disengagement direction 302 for electrical decoupling of the upper and lower conductors 160, 180 from the power busbar 20. In alternate embodiments, the biasing member 250 may be any member that biases the leer arm in the engagement direction, including, but not limited to a spring, flexible and/or compressible member, a cam, and the like.

Figure 5:
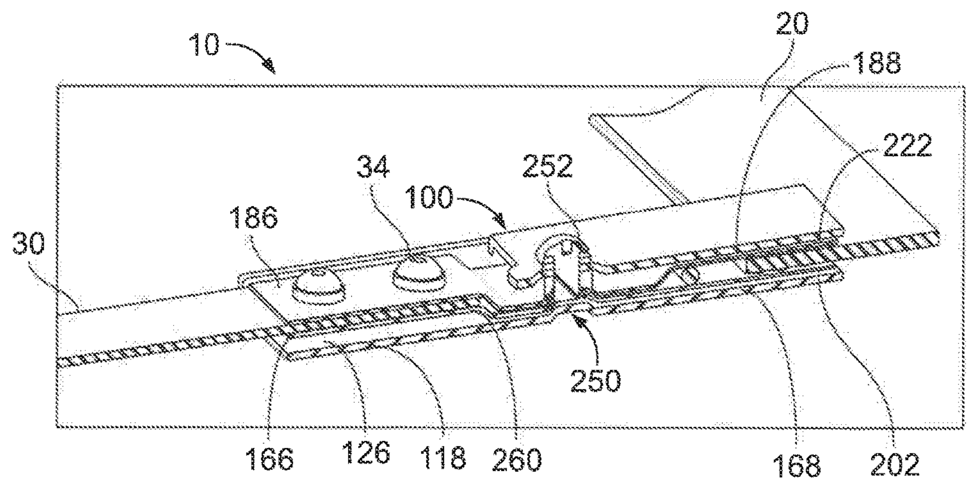
FIG. 5 is a cross-section perspective view of the electrical connector in an engaged position in accordance with an embodiment.

FIG. 4 is a cross-section perspective view of the electrical connector 100 in a disengaged position in accordance with an embodiment. FIG. 5 is a cross-section perspective view of the electrical connector 100 in an engaged position in accordance with an embodiment. In an exemplary embodiment, the conductor terminal end 166 of the lower conductor 160 is proximate the conductor terminal end 186 of the upper conductor 180 defining a slot 260 therebetween. The slot 260 is configured for receiving a portion of the component terminal 30 and establish electrical communication between the conductors 160, 180 and the component terminal 30. The fasteners 34 extend through the holes 192, 172 of the upper and lower conductors 160, 180 and holes 32 of the component terminal 118 (FIG. 3) and engage the threaded holes 126 of the base terminal end 118 to secure the component terminal 30 to the electrical connector 100.

In an exemplary embodiment, the conductor contact end 168 of the lower conductor 160 is proximate the conductor contact end 188 of the upper conductor 180 defining an opening 194 therebetween. The opening 194 is configured for receiving a portion of the power busbar 20. In the disengaged position (FIG. 4), the fastener 252 of the biasing member 250 is retracted to allow the lever arm 140 to rotate in the disengagement direction, thereby increasing the spacing between the contact ends 168, 188. For example, the conductor contact end 188 of the upper conductor 180 may be positioned at an angle 189 of about 3-5° relative to the conductor contact end 168 of the lower conductor 160. In the engaged position (FIG. 5), the fastener 252 of the biasing member 250 is advanced against the lower wall 116 of the base 110 to rotate the lever arm 140 in the engagement direction until the contact ends 168, 188 electrically couple with the power busbar 20 at the contact points 202, 222. As the fastener 252 advances, the contact force between the conductor contact ends 168, 188 and the power busbar 20 increases to provide a low resistance electrical connection. The electrical connector 100 may electrically couple at any location along the power busbar 20.

Figure 6:
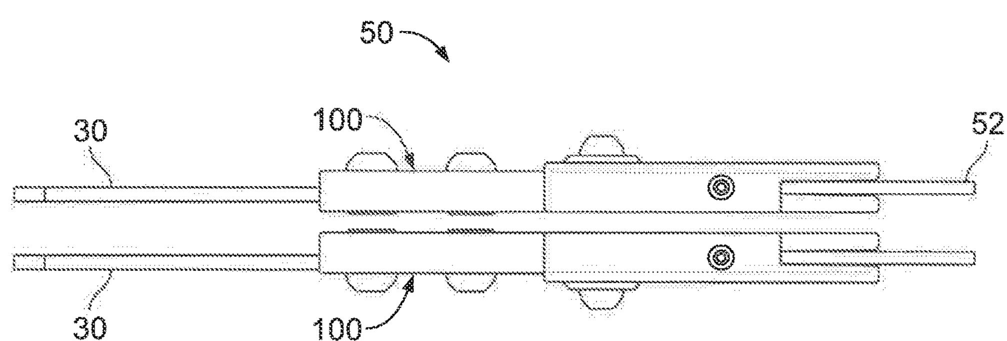
FIG. 6 is a side view of a pair of electrical connectors for a power distribution system in accordance with an alternate embodiment.

FIG. 6 is a side view of a pair of electrical connectors 100 for a power distribution system 50 in accordance with an alternate embodiment. The power distribution system 50 is adapted to communicate electrical power from a power source (not shown) to one or more electrical devices or components (not shown) via an electrical conductive path. In an exemplary embodiment, the electrical conductive path may include two power busbars 52, two component terminals 30, and the electrical connector 100 detachably coupled therebetween. Optionally, the power distribution system 50 may include any number of power busbars 20, component terminals 30, and/or electrical connectors 100. In an exemplary embodiment, the power distribution system 10 may be configured to convey up to 500 amps through the electrical conductive path, but may be configured to convey any amount of power. In the illustrated embodiment, the electrical connector 100 conveys electrical power in the power distribution system 10. However, the power distribution system 10 may be another type of electrical system in an alternative embodiment. For example, the power distribution system 10 may be any device that includes a power busbar 20 configured to convey electrical power to one or more electrical components 30. The power busbar 20 is similar to the power busbar of FIGS. 1-5, except that it includes two vertically orientated linear bars. The electrical connectors 100 are identical to the electrical connectors 100 of FIGS. 1-5.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. An electrical connector comprising:
- a base disposed along a central axis and having a base terminal end and a base contact end;
- a lever arm disposed along the central axis and having a biasing end and a lever arm contact end;
- at least two conductors interposed between the base and the lever arm, each conductor having a conductor contact end, the conductor contact ends oppose each other and are separated by an opening configured to receive a power busbar, each conductor having a conductor terminal end, the conductor terminal ends oppose each other and are separated by a slot configured to receive an electrical component; and
- a hinge pivotally attached between the base and the lever arm at a pivot axis for rotation of the lever arm about the pivot axis between an engaged position for electrical coupling of the at least two conductors with the power busbar and a disengaged position for electrical decoupling of the at least two conductors from the power busbar, wherein a size of the opening when the lever arm is in the engaged position is less than the size of the opening when the lever arm is in the disengaged position.

2. The electrical device of claim 1, further comprising a biasing member operatively connected between the base and the lever arm, the biasing member configured for biasing the lever arm in an engagement direction towards the engaged position.

3. The electrical device of claim 2, wherein the biasing member includes a fastener threadedly engaged with a threaded bore of the lever arm, wherein the fastener is configured to advance through the threaded bore and exert a force against the base to move the lever arm in the engagement direction, wherein the fastener is configured to retract through the threaded bore to allow for movement of the lever arm in a disengagement direction.

4. The electrical device of claim 1, further comprising a biasing member operatively connected between the base and the lever arm, the biasing member configured to apply a contact force between the at least two conductors and the power busbar via the lever arm in the engaged position.

5. The electrical device of claim 1, further comprising one or more contacts at the conductor contact end, the contacts configured for electrical coupling with the power busbar in the engaged position.

6. The electrical device of claim 1, further comprising an array of contacts configured to provide a reliable electrical contact between the conductor and the power busbar at a plurality of contact points in the engaged position.

7. The electrical device of claim 1, further comprising a plurality of contacts extending from a terminating end of each conductor contact end.

8. The electrical connector of claim 1, further comprising one or more contacts, each contact having one or more arcuate portions configured to provide electrical contact with the power busbar at one or more contact points in the engaged position.

9. The electrical device of claim 1, further comprising fasteners configured to attach the least two conductors to the base.

10. An electrical connector for electrical communication between a power busbar and an electrical component, comprising:
- a base having a base terminal end and a base contact end;
- a lever arm having a biasing end and a lever arm contact end;
- a conductor interposed between the base and the lever arm, the conductor having a conductor contact end proximate the lever arm contact end, and a conductor terminal end configured for electrical coupling with the electrical component;
- a hinge pivotally attached between the base and the lever arm at a pivot axis for rotation of the lever arm about the pivot axis in an engagement direction or in a disengagement direction, the lever arm rotates between an engaged position for electrical coupling of the conductor with the power busbar and a disengaged position for electrical decoupling of the conductor from the power busbar, wherein movement of the lever arm in the engagement direction moves the lever arm toward the base and movement of the lever arm in the disengagement direction moves the lever arm away from the base; and
- a biasing member operatively connected between the base and the lever arm, the biasing member configured for biasing the lever arm in the engagement direction towards the engaged position.

11. The electrical connector of claim 10, wherein the biasing member includes a fastener threadedly engaged with a threaded bore of the lever arm, wherein the fastener is configured to advance through the threaded bore and exert a force against the base to move the lever arm in the engagement direction, wherein the fastener is configured to retract through the threaded bore to allow for movement of the lever arm in the disengagement direction.

12. The electrical connector of claim 10, wherein the biasing member is configured to apply a contact force between the conductor and the power busbar via the lever arm in the engaged position.

13. The electrical connector of claim 10, further comprising one or more contacts at the conductor contact end of the conductor, the one or more contacts configured for electrical coupling with the power busbar at one or more contact points.

14. The electrical connector of claim 10, further comprising an array of contacts proximate the conductor contact end, the array of contacts configured to provide a reliable electrical contact between the conductor and the power busbar at a plurality of contact points in the engaged position.

15. The electrical connector of claim 10, further comprising one or more contacts extending from the conductor contact end along a central axis and having one or more arcuate portions configured to provide electrical contact with the power busbar at one or more contact points in the engaged position.

16. The electrical connector of claim 10, further comprising fasteners configured to attach the conductor terminal end to the base terminal end.

17. The electrical connector of claim 10, wherein the conductor is a first conductor, the electrical connector further comprising a second conductor interposed between the base and the lever arm, the second conductor having a conductor contact end and a conductor terminal end, wherein the conductor terminal end of the second conductor is proximate the conductor terminal end of the first conductor defining a slot therebetween configured for receiving at least a portion of the electrical component.

18. The electrical connector of claim 10, wherein the conductor is a first conductor, the electrical connector further comprising a second conductor interposed between the base and the lever arm, the second conductor having a conductor contact end proximate the base contact end, wherein the conductor contact end of the second conductor is proximate the conductor contact end of the first conductor defining an opening therebetween configured for receiving a portion of the power busbar, the second conductor having a conductor terminal end configured for electrical coupling with the electrical component.

19. An electrical connector, comprising:

a base disposed along a central axis and having a base terminal end and a base contact end;

a lever arm disposed along the central axis and having a biasing end and a lever contact end, the lever arm being pivotally connected to the base at a pivot axis;

at least one conductor interposed between the base and the lever arm, the conductor having a conductor contact end configured to receive a power busbar, the conductor having a conductor terminal end configured to receive an electrical component, the conductor having a plurality of contacts having one or more arcuate portions configured to provide electrical contact with the power busbar at one or more contact points in the engaged position;

a hinge member pivotally attached between the base and the lever arm at the pivot axis for movement of the lever arm about the pivot axis between an engaged position for electrical coupling of the conductor with the power busbar and a disengaged position for electrical decoupling of the conductor from the power busbar; and a biasing member having a fastener threadedly engaged with a threaded bore of the lever arm, wherein the fastener is configured to advance through the threaded bore and exert a force against the base to move the lever arm in an engagement direction toward the engaged position, wherein the fastener is configured to retract through the threaded bore to allow for movement of the lever arm in a disengagement direction toward the disengaged position.

20. The electrical connector of claim 19, wherein movement of the lever arm in the engagement direction moves the lever arm toward the base and movement of the lever arm in the disengagement direction moves the lever arm away from the base.

* * * * *